Jan. 11, 1949. R. D. COWHERD ET AL 2,458,683
SEQUENCE CONTROL
Filed Jan. 7, 1943 3 Sheets-Sheet 1

INVENTOR
ROBERT D. COWHERD
WILLIAM H. STAHL JR.
BY
E. C. Sanborn
ATTORNEY

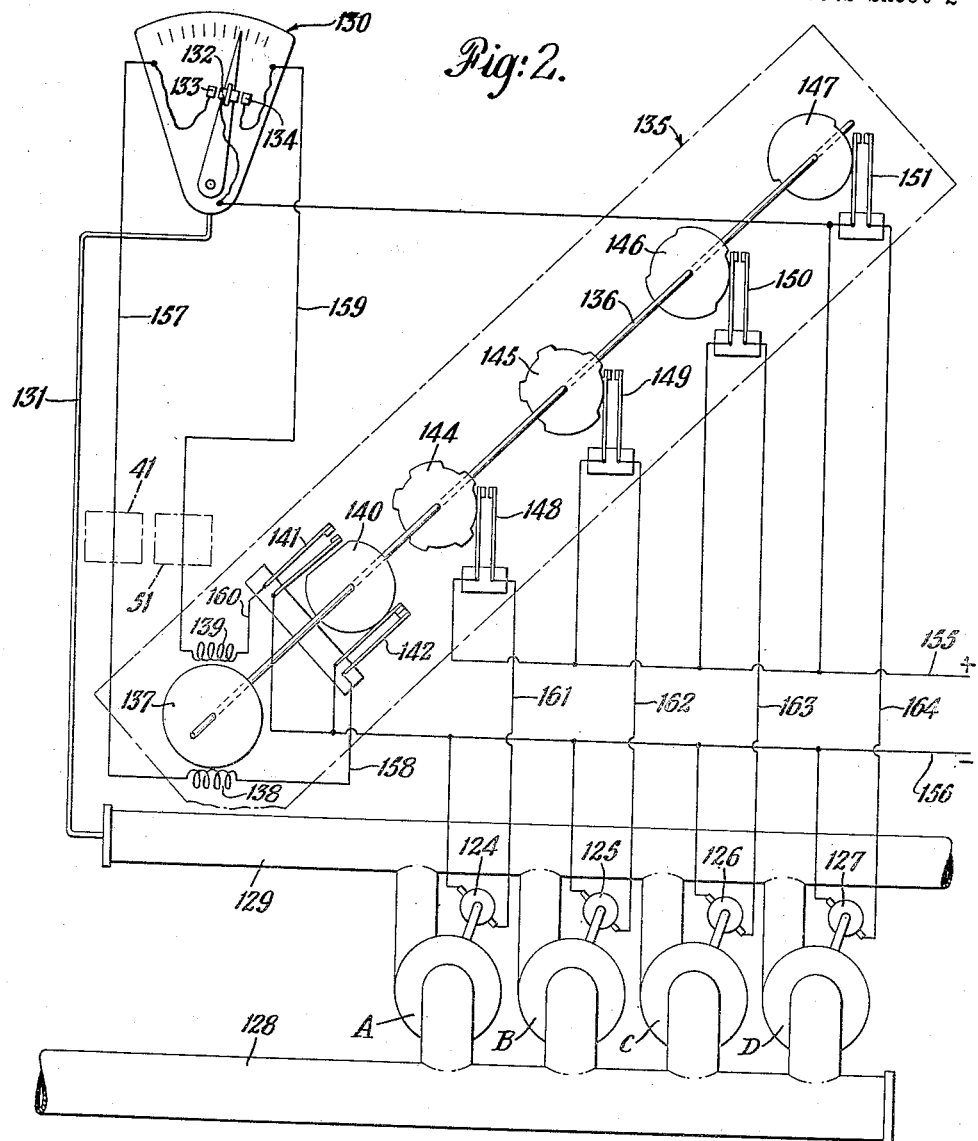

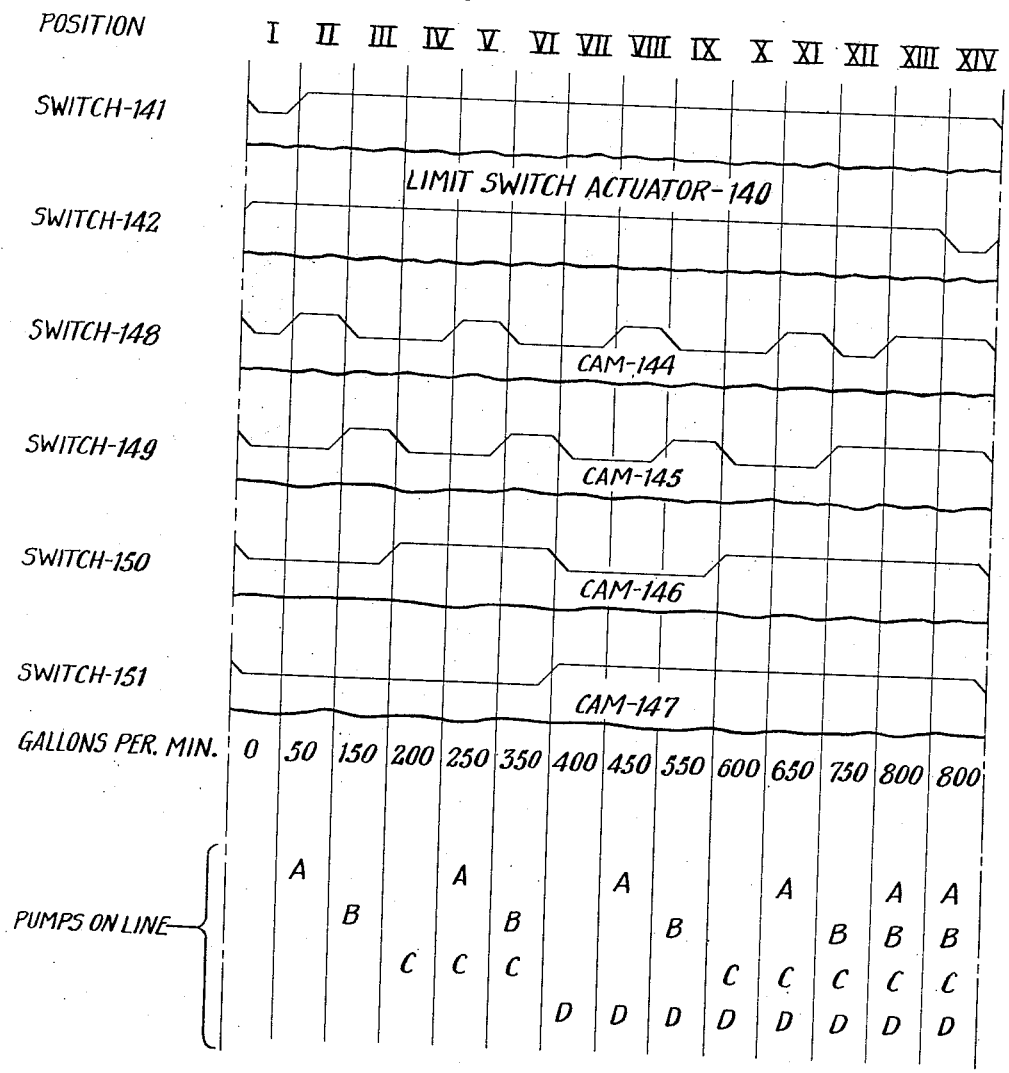

Patented Jan. 11, 1949

2,458,683

UNITED STATES PATENT OFFICE 2,458,683

SEQUENCE CONTROL

Robert D. Cowherd, Atlanta, Ga., and William H. Stahl, Jr., Waterbury, Conn., assignors to The Bristol Company, Waterbury, Conn., a corporation of Connecticut Application January 7, 1943, Serial No. 471,620

1 Claim. (Cl. 103—25)

This invention relates to the control of a variable condition such as pressure, temperature, or the like. It has been specifically developed in conjunction with the control of a plurality of driving units, such as pumps or blowers, for maintaining a fluid pressure at a substantially constant value, and will be described with particular reference to such control by way of illustration.

It is the object of this invention to provide for the purpose set forth a control system in which the selection of the proper combination of controlled units will be automatically effected with a minimum of pressure variation.

It is a further object of the invention to provide means for effecting the desired control through the use of a simple form of pressure gauge having only a single set of contacts.

A further object of the invention is to provide a control system of the above nature in which the operating characteristics are readily adjustable.

A further object of the invention is to provide a control system of the above nature in which it shall be possible to add further controlled units with a minimum of modification in the original installation.

The invention further provides a control system of the above nature in which, if the pressure should reach the low control point and then rise to some point between the high and low values during a given period, the pump combination will not be changed.

It is a further object of the invention to provide a control of the above nature in which, if the pressure should reach the high control point and maintain this value for a period greater than a predetermined time interval, a selected pump or combination of pumps shall be cut off the line, this action being repeated on other units until the pressure drops below said high control point.

Other features of the invention will be hereinafter described and claimed.

In the accompanying drawings:

Fig. 2 is a diagrammatic representation of an alternative form of the control system embodied in the invention, and adapted to the control of a group of four pumps.

Fig. 3 is a diagram showing the relative conformation and positioning of certain control elements characterizing the form of the invention shown in Fig. 2.

Fig. 4 is a diagrammatic view illustrating a modification of the form of the invention shown in Fig. 2.

Figure 1:
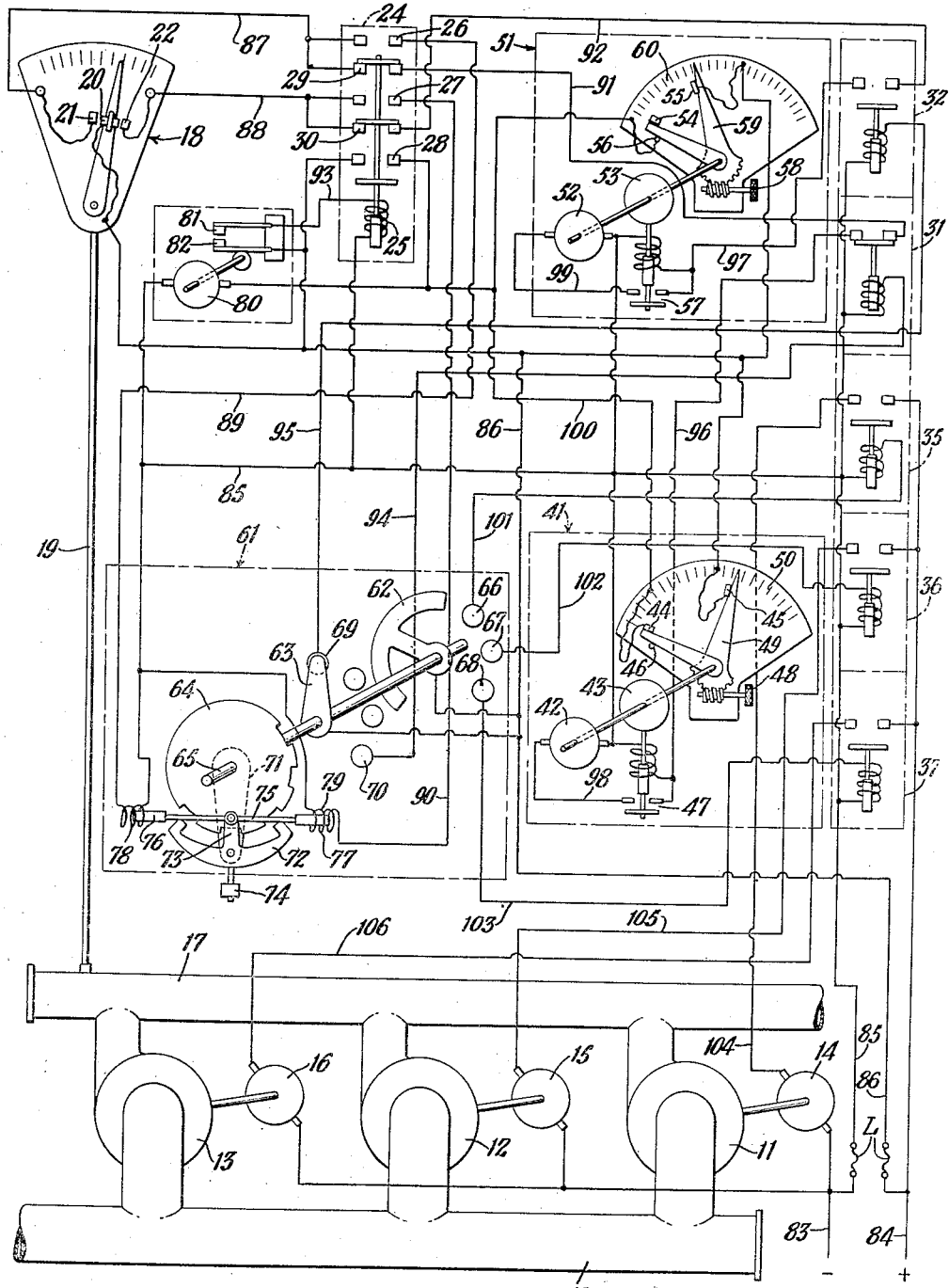
Fig. 1 is a diagrammatic representation of a control system embodying the principles of the invention and adapted to the control of three separate centrifugal pumps feeding into a common main.

Referring now to the drawings: The numeral 10 designates a source of water supply from which one or more of three centrifugal pumps 11, 12, and 13, driven by electric motors 14, 15, and 16 respectively, are adapted to pump water into a supply main 17 in which it is desired to maintain a constant pressure as determined by a gauge 18 connected to the main 17 by means of a conduit 19. The movable pointer of the gauge 18 carries a contact 20 adapted to make electrical connection with an adjustable stationary contact 21 when the pressure measured by said gauge is below a predetermined value and with an adjustable stationary contact 22 when said pressure is above said value.

A relay 24 adapted to be actuated by a winding 25 has five sets of contacts; three, designated as 26, 27, and 28 respectively, normally open; and two, designated as 29 and 30, normally closed. Two relays 31 and 32 are provided, with contacts adapted to be opened upon energization of their actuating coils and closed upon deenergization of said coils. Three similar relays 35, 36, and 37 are provided with normally open contacts of sufficient capacity to carry the operating currents of the pump motors 14, 15, and 16, and adapted to be closed upon energization of their respective actuating coils. These may be motor starters of any conventional type.

A timing relay 41 of the instantaneous-reset type is provided with a constant-speed driving motor 42 acting through a magnetic clutch 43 to cause a contact 44 to be advanced to meet a normally stationary contact 45 when the clutch is energized and the motor 42 running, and to reset instantly to a fixed stop 46 when the clutch is deenergized. Associated with the clutch 43 is a contact 47 normally open, and adapted to be closed only for such time as the operating winding of said clutch is energized. The position of the stationary contact 45 can be set by means of an adjusting screw 48, so that the time lapse between energization of the motor and closing of the contacts can be varied through a wide range, and determined by the excursion of an attached pointer 49 with respect to a graduated scale 50.

A timing relay 51 of the instantaneous-reset type is provided with a constant-speed driving motor 52 acting through a magnetic clutch 53 to cause a contact 54 to be advanced to meet a normally stationary contact 55 when the clutch is energized and the motor 52 running, and to reset instantly to a fixed stop 56 when the clutch is deenergized. Associated with the clutch 53 is a contact 57 normally open, and adapted to be closed only for such time as the operating winding of said clutch is energized. The position of the stationary contact 55 can be set by means of an adjusting screw 58, so that the time lapse between energization of the motor and closing of the contacts can be varied through a wide range, and determined by the excursion of an attached pointer 59 with respect to a graduated scale 60.

A stepping relay 61 includes two contact arms 62 and 63, and a wheel 64 having a plurality of notches evenly spaced about a portion of its periphery, said arms and wheel being fixed to a common rotatable shaft 65. The contact arm 62 is adapted to engage stationary contacts 66, 67 and 68, and is so formed that as it is advanced from one of said contacts to another, the contacts first engaged remain in the circuit as further contacts are included. The contact arm 63 is adapted to engage a stationary contact member 69 when at one limit of its travel, and to engage a stationary contact member 70 when at the other limit. Rotatably mounted upon the shaft 65 is an arm 71 carrying a double-ended pawl element 72 pivotally mounted upon the extremity thereof, and adapted, when rotated through a small angle about its mounting, to engage the notches on the wheel 64 to rotate the same. Attached to the pawl element 72 is an arm 73 radially disposed with respect to the arm 71, and adapted when deflected through a limited angle about the pivot point of said pawl element to cause said element to rock about its mounting on the arm 71 and to engage one or other of the notches on the wheel 64. Attached to the pawl element 72 is a weight 74 adapted to maintain the arms 71 and 73 normally in line with each other and in a vertical position, with the pawl element 72 disengaged from the notches in the wheel 64.

Pivotally connected to the extremity of the arm 73 is a rod 75 carrying two oppositely disposed plungers 76 and 77 formed of magnetic material and adapted to be acted upon by solenoids 78 and 79 respectively. The arrangement of the mechanism associated with the wheel 64 is such that upon energization of the solenoid 78 the plunger 76 will be attracted, causing the arm 73 to rotate the pawl element 72 through a limited angle about its point of pivoting on the arm 71, whereby said pawl element will be caused to engage one of the notches on the wheel 64. Upon continued energization of the solenoid 78 the force applied to the arm 73 will cause the arm 71 to be rotated in a clockwise sense as shown in the drawing, through a limited angle about the the shaft 65, and the wheel 64 to be moved through a similar angle by virtue of its engagement with the pawl element 72. The parts of the stepping relay are so proportioned that a single increment of motion as communicated to the wheel 64 and the shaft 65 by one impulse derived from the solenoid 78 will cause the contact arms 62 and 63 to be advanced through a distance corresponding to the spacing between consecutive stationary contacts engaged by said contact arm 62. The action of the stepping relay upon energization of the solenoid 79 will be exactly similar to that set forth, but in a reverse sense.

A motor-operated interrupter 80 is provided with a single pair of contacts 81 and 82, and by means hereinafter to be set forth, is caused always when coming to rest to do so with said contacts in a separated position.

For purposes of clarity in describing the electrical connections of the control system it will be assumed that the apparatus is adapted for operation from a direct current source having a negative main conductor 83 and a positive main conductor 84. It is understood, however, that the system is readily adaptable for use on alternating-current supply, and in fact would in all likelihood be used on such an installation, and that the pump motors would probably be adapted for use on a polyphase electric system. The electrical connections by which the system may be rendered operative are as follows: A pair of conductors 85 and 86, connected through suitable protective fuse links L—L to the main conductors 83 and 84, provide negative and positive bus respectively for the connections of the control network. The common contact 20 of the gauge 18 is connected to the positive bus 86; the "low" contact 21 of said gauge is connected by means of a conductor 87 to one side of the normally open contact 26 and one side of the normally closed contact 29 in the relay 24; and the "high" contact 22 by means of a conductor 88 to one side of the normally open contact 27 and of the normally closed contact 30 in the relay 24. The free terminal of contact 26 is connected by a conductor 89 to one end of the solenoid 78 in the stepping relay 61; the free terminal of contact 27 is connected by means of a conductor 90 to one end of the solenoid 79 in the stepping relay 61; and the other ends of said solenoids are both connected to the negative bus 85. The free terminal of contact 29 in the relay 24 is connected by means of a conductor 91 to one side of the contact of relay 31; and the free terminal of contact 30 in the relay 24 is connected by means of a conductor 92 to one side of the contact of relay 32. One side of the actuating coil 25 of the relay 24 is connected to the negative bus 85, and the other side by means of a conductor 93 to contact 81 of the interrupter 80. Contact 82 of said interrupter is connected to the positive bus 86. One side of the actuating coil of the relay 31 is connected by means of a conductor 94 to contact 70 in the stepping relay 61; and one side of the actuating coil of relay 32 is connected by means of a conductor 95 to the contact 69 in said stepping relay. The free terminals of the coils of relays 31 and 32 are both connected to the negative bus 85. The free terminal of the contact of relay 31 is connected by means of a conductor 96 to one end of the electromagnet of the clutch 43 in the timing relay 41, and also to one side of the contact 47 actuated by said electromagnet. The free terminal of the contact relay 32 is connected by means of a conductor 97 to one side of the electromagnet of the clutch 53 in the timing relay 51, and also to one side of the contact 57 actuated by said electromagnet. The free terminal of the contact 47 in the timing relay 41 is connected by means of a conductor 98 to one side of the motor 42; the free terminal of the contact 57 in the timing relay 51 is connected by means of a conductor 99 to one side of the motor 52; and the free terminals of the motors 42 and 52 and of the electromagnets in the clutch 43 and 53 are all connected to the negative bus 85. The movable contacts 44 and 54 in the timing relays are interconnected by means of a conductor 100, which in turn is connected to one terminal of the contact 28 in the relay 24 and also to one terminal of the interrupter motor 80, the other terminal of said contact 28 being connected to the positive bus 86, and the other terminal of said motor to the negative bus 85.

Contact arms 62 and 63 of the stepping relay 61 are both connected to the positive bus 86. Contacts 66, 67 and 68 of said relay are connected by conductors 101, 102, and 103 to one side each of the actuating coils of relays 35, 36, and 37 respectively, the free sides of said coils being connected to the negative bus 85. One side of each of the contacts of relays 35, 36 and 37 is connected to the main positive conductor 84. The free side of the contact of relay 35 is connected by means of a conductor 104 to one side of the pump motor 14, the free side of the contact of relay 36 by means of a conductor 105 to one side of the pump motor 15, and the free side of the contact of relay 37 by means of a conductor 106 to one side of the pump motor 16, the free terminals of said pump motors all being connected to the negative main conductor 83.

The connections of the system as described provide for the energization of the control circuits from the same source 83—84 as the pump motors; but by removal of the links L—L the two networks may be completely separated and adapted for energization from independent sources.

For the purpose of explaining the operation of the control system it may first be assumed that the pressure in the supply main 17 is for the moment at the set value of the gauge 18, so that neither of the contacts 21 and 22 is engaged by the common contact 20, and also that the stepping relay is in the position shown in the drawing, with the contact arm 62 out of engagement with any of its cooperating contacts 66, 67, and 68, and the contact arm 63 engaging the contact 69. Under this condition the relays 35, 36, and 37 will remain deenergized, with their contacts open, so that no power will be supplied to the pump motors 14, 15, and 16, and these motors will remain at rest.

With contacts 21 and 22 both out of engagement with the contact 20 no connection exists from the conductors 87 and 88 to the negative bus 85, so that whatever position may be assumed by the relay 24, no circuit can be completed, through any of its contacts 26, 27, 29, and 30. Therefore, without respect to the position of the relays 31 and 32, the magnetic clutch coils 43 and 53 in the timing relays 41 and 51 will remain deenergized and the contacts 47 and 57 opened. Thus, the motors 42 and 52 in said timing relays will remain at rest, and the contacts 44 and 54 will lie in their zero positions as determined by the stops 46 and 56. There being no engagement between the contacts 44 and 45 or between the contacts 54 and 55, no connection is established between the conductor 100 and the positive bus 86, so that the interrupter motor 80 will remain at rest. For reasons hereinafter to be set forth it will be seen that the only position in which the motor 80 can come to rest at the termination of an operating cycle is one in which the contacts 81 and 82 are separated. Under this condition the actuating coil 25 of the relay 24 will be deenergized, and said relay will stand with its contacts 29 and 30 closed and its contacts 26, 27, and 28 opened, thus leaving denergized the solenoids 78 and 79 of the stepping relay 61. Contact arm 63 of the stepping relay 61 being in engagement with contact element 69, there will be provided a path whereby current may flow from the positive bus 86 through conductor 95 and the actuating coil of relay 32 to the negative bus 85, energizing said relay and opening its contacts. There being no connection between conductor 94 and the positive bus, relay 31 will remain deenergized and will stand with its contacts closed.

With the foregoing description of the relationship of elements of the system in view, consideration may now be given to performance of the apparatus under the following typical operating conditions:

(1) *Pressure below the low control point setting—no pumps running.*

When the pressure in the conduit 17 falls below the desired value, or range of values, the contact 20 in the gauge 18 will engage the "low" contact 21, completing a circuit whereby current may flow the positive bus 86 through the conductor 87 and the contact 29 in the relay 24, and conductor 91 through the closed contact of relay 31, and conductor 96, to the actuating coil of magnetic clutch 43 in the timing relay 41, and thence to the negative bus 85. Simultaneously with the actuation of the magnetic clutch 43 the contact 47 is closed, allowing the motor 42 to become energized and the contact 44 to be started from its position of rest toward engagement with the contact 45. No further action of the control system will take place while the contact 44 is in transit from its position of rest toward the set position of the contact 45. If during this interval the pressure as measured by the gauge 18 should for any reason rise to the set point, the contacts 20 and 21 will be separated, the actuating coil of the magnetic clutch 43 deenergized, and the contact 44 immediately reset to zero.

Should the low pressure condition be maintained during the established time interval of the timing relay 41, the contact 44 will engage the contact 45, establishing a connection between the positive bus 86 and the conductor 100, whereby the motor of interrupter 80 will be energized and the contacts 81 and 82 brought into intermittent engagement. The first engagement between said contacts 81 and 82 will permit current to flow from the positive bus 86 through the conductor 93 and the actuating coil 25 of the relay 24 to the negative bus 85, thus energizing said coil and causing the contacts 29 and 30 in said relay to be opened and contacts 26, 27, and 28 to be closed. The closing of contact 28 will allow current from the positive bus 86 to pass directly through the motor of the interrupter 80 to the negative bus 85, thus bridging the contacts 44 and 45 in the timing relay 41. The opening of contact 29 will deenergize the timing relay 41, causing the contact 44 to be separated from the contact 45 and reset to its zero position. These contacts being bridged, however, by contact 28, their separation will not deenergize the motor of the interrupter 80, which motor will continue to run until it attains a position where the contacts 81 and 82 are separated, deenergizing the coil 25, allowing the relay 24 to revert to its original position, thus opening the contact 28 and deenergizing the motor of the interrupter 80 in a position where the contacts 81 and 82 are separated.

The closing of the contact 26 during the energization of the coil 25 provides a path for current from the positive bus 86 through the contacts 20 and 21 and the conductor 87, to the conductor 89, and thereby through the solenoid 78 in the stepping relay 61 to the negative bus 85. Solenoid 78, acting upon the plunger 76 and the rod 75 will cause the arm 73 and the pawl element 72 to be rotated first in a counter-clockwise sense as seen in the drawing through a small angle about the pivoting point of said pawl element until its right hand extremity engages one of the notches upon the periphery of the wheel 64, inhibiting further rotation of the pawl element 72. Continuation of the force upon the rod 75 will cause the arm 71 to be rotated about the axis of shaft 65, and the wheel 64 to be similarly rotated in a clockwise sense as seen in the drawing, causing the shaft 65 to be angularly displaced, the arm 63 to be cleared from the contact element 69 and the contact arm 62 brought into engagement with the contact element 66. Upon release of the relay 24 the solenoid 78 will be deenergized, and the pawl mechanism will revert to its original position, leaving the contact arms 63 and 62 in their displaced positions.

Separation of contact arm 63 from contact element 69 will cause the relay 32 to be deenergized and its contacts closed. Engagement of the contact arm 62 and the contact element 66 will provide a path for current from the positive bus 86 through the conductor 101 and the actuating coil of relay 35 to the negative bus 85, thus closing the contacts of relay 35 and allowing current to pass from the main positive conductor 84 and the conductor 104 to the pump motor 14 and thence to the main negative conductor 83, whereby said motor will be energized and the pump 11 placed in service.

(2) *Pressure remaining below the low control point—one pump running*

Immediately upon the deenergization of relay 24 during the starting cycle of the pump 11, the contact 29 will be closed; and, should the contacts 20 and 21 in the gauge 18 still be in engagement, the timing relay 41 will have a second cycle initiated, and the contact 44 will again approach the contact 45 as in the previous instance. Should the pressure as measured by the gauge 18 fail to rise sufficiently to disengage contact 20 from contact 21 during the timing interval established by the setting of the relay 41, the contacts of said timing relay will be closed, energizing as before the motor of the interrupter 80 and causing an impulse to be imparted to the relay 24, which in turn, through the contacts 26, will cause the solenoid 78 of the stepping relay 61 to be energized and the contact arm 62 advanced to a position where it engages both the contact elements 66 and 67, thus energizing the relay 36 and bringing into action the pump 12 in addition to pump 11 which is already on the line.

(3) *Pressure remaining below the low control point—two pumps running*

Should the united efforts of pumps 11 and 12 be insufficient to raise the pressure above the low control point, the contacts 20 and 21 will remain in engagement; and should such a condition be maintained over a time interval represented by the setting of relay 41, the starting cycle as above will be repeated, and pump 13 automatically put in service on the line. Upon the advancing of the shaft 65 in the timing relay 61 to the final position, which corresponds to engagement of the contact arm 62 with the contact element 68, the contact arm 63 will be brought into engagement with the contact element 70, causing relay 31 to be energized and to open its contacts, whereupon there is no longer any complete circuit between the contact 29 in the relay 24 and the energizing coil in the timing relay 41. Thus, even should the contacts 20 and 21 of the gauge 18 remain together, no further action of the control mechanism can take place.

(4) *Pressure comes within control zone during starting cycle*

As pointed out under condition 1 above, should the pressure rise above the low control point during the time interval as established by the setting of the relay 41, the actuating coil of the clutch 43 will be deenergized before the contact 44 comes into engagement with the contact 45; and the timing relay will be re-set without the starting of further pump motors.

(5) *Pressure attains high contact setting*

When the pressure exceeds a desired value, or range of values, contact 20 of gauge 18 is brought into engagement with the "high" contact 22, whereby current may flow from the positive bus 86 through the conductor 88, the contacts 30 in the relay 24, the conductor 92, the contacts of relay 32, conductor 97, and the actuating coil of magnetic clutch 53 to the negative bus 85. Energization of the clutch magnet will also close the contact 57, causing the motor 52 to be started and the contact 54 to begin its excursion from the stop 56 toward the adjustable contact 55. Should the high pressure be maintained for a time equivalent to the pre-established interval as set on the timing relay 51, contacts 54 and 55 will be brought together, whereby, in a manner similar to the hereinabove described operation of the relay 41, the motor of the interrupter 80 will be started, the contacts 81 and 82 momentarily closed and the actuating coil 25 of the relay 24 energized. Actuation of the relay 24 will cause the contacts 30 to be opened and the contacts 27 to be closed, whereby, through conductor 90, the solenoid 79 of the stepping relay 61 will be energized and the shaft 65 rotated through one increment in a sense opposite to that associated with low pressure, separating contact arm 62 from the contact element 68, deenergizing the relay 37 and cutting the pump 13 out of service.

Should the pressure continue at the high value after stoppage of the pump 13, the cycle as above will be repeated, and pump 12 shut down; and, upon further continued maintenance of high pressure for an interval exceeding the setting of the timing relay 41, the pump 11 will be removed from service.

It will be seen that there has thus been provided a system adapted to the control of a plurality of pumps, whereby, with a minimum of variation of pressure from a predetermined set value, selection will be made of a group of pumps best suited to the maintenance of said pressure. By selecting the pumps to have suitably flat characteristics, and combining pumps of suitable relative capacities, it will be possible to operate the system at a maximum degree of efficiency through an extremely wide range of demand values. The adjustable timing features of the relays 41 and 51 provide for transient conditions, eliminating erratic operation in the event of surges in the system, and also giving time for any particular pump or combination to establish a steady condition, before initiating further action on the part of the control elements.

In Fig. 2 is shown an alternative form of control embodying the principles of the invention and including a time-cycle-control instrument, whereby there is made possible a wide variety of pump combinations suited to the demands made upon the system. Four pumps A, B, C, and D of capacities hereinafter to be set forth, are arranged to be driven by motors 124, 125, 126, and 127 respectively, for the purpose of transferring a liquid from a source of supply 128 to a conduit 129 in which it is required to maintain within specified limits the pressure as measured by a controlling pressure gauge 130 connected to the conduit 129 by a tube 131. The gauge 130 is provided with a common contact element 132, movable in response to changes in the measured pressure and adapted to engage an adjustable stationary contact 133 when said pressure falls below a predetermined set value and to engage an adjustable stationary contact 134 when said pressure rises above said predetermined value.

A cycle control instrument 135 comprises a shaft 136 adapted to be rotated at a constant velocity by a reversible motor element 137 having two windings 138 and 139 adapted to operate said motor to rotate the shaft 136 in a clockwise and a counter-clockwise sense respectively, according to which of the windings 138, 139 is electrically energized.

Carried by the shaft 136 is a limit switch actuator 140 adapted to separate normally closed contacts 141 or 142 according to which limit of its travel has been attained by the motor element 137. As shown in the drawing, the shaft 136 is standing in such a position that the limit switch 141 is open and the limit switch 142 closed. Mounted upon the shaft 136 are four cam elements 144, 145, 146, and 147, having operatively associated therewith electric switch elements 148, 149, 150, and 151 respectively. The cam elements are provided with indentations and projections upon their peripheries, whereby said switch elements may be actuated to open or close their contacts in response to the angular positions attained by said cams. The relative positionings of the contour features of said cams are indicated in Fig. 3, and will hereinafter be more fully discussed.

In the interest of simplicity in outlining the wiring diagram, the system may be, as in the form hereinbefore described, be considered as adapted for use on a two-wire power supply system having a positive bus 155 and a negative bus 156. The common contact element 132 in the gauge 130 is directly connected to the positive bus 155. The "low" contact 133 is connected by means of a conductor 157 to one end of the winding 138 of the motor 137, and the other end of said winding by means of a conductor 158 to the limit switch 142 and thence to the negative bus 156. The "high" contact 134 of the gauge 130 is connected by means of a conductor 159 to one end of the winding 139 in the motor 137 and the other end of said winding by means of a conductor 160 to the limit switch 141 and thence to the negative bus 156. One terminal of each of the pump motors 124, 125, 126, and 127 is connected to the negative bus 156. The remaining terminal of the motor 124 is connected by means of a conductor 161 to the switch element 148 and thence to the positive bus 155. The remaining terminal of the motor 125 is connected by means of a conductor 162 to the switch element 149 and thence to the positive bus 155. The remaining terminal of the motor 126 is connected by means of a conductor 163 to the switch element 150 and thence to the positive bus 155. The remaining terminal of the motor 127 is connected by means of a conductor 164 to the switch element 151 and thence to the positive bus 155.

For purposes of explanation of the operating principle of the control system, it may be assumed that the pumps A, B, C, and D have been selected to have normal capacities of 50, 150, 200, and 400 gallons per minute. By properly distributing the projections and depressions about the peripheries of the several cams in the instrument 135, it will be possible to operate these pumps in various combinations, so that the capacity of any pump or of any combination of pumps may be utilized and rendered available subject to the command of the contacting gauge 130. A typical shaping of the cams to effect such a purpose will be seen by reference to Fig. 3, in which is shown a development of the several cams including that which actuates the limit switches. With the arrangement given, it is possible to obtain fourteen significant positions of the cam shaft 136, each position corresponding to a predetermined pump capacity suited to a particular demand for liquid handled.

The cam peripheries are diagrammatically represented in such a way that, when the contour line as shown in the diagram is high, the corresponding switch is closed, and when the contour line is low the switch is open. Considering now the conformation of the individual cams, it will be seen that the limit switch actuator 140 (which for purposes of simplicity is shown as a single cam) is so conformed that switch 141, in series with the winding 139 of the motor 137, is open in the first position of the cam shaft and is closed in all other positions; while the switch 142, in series with the winding 138 in said motor, is closed in all positions excepting the last. In order to avoid confusion, the fourteen positions of the cam shaft 136, together with the cams affixed thereto, are designated in the diagram by the corresponding roman numerals. The contour of cam 144 is so conformed that switch 148 controlled thereby will be closed when the cam attains positions II, V, VIII, XI, XIII, and XIV. The contour of cam 145 is so conformed that switch 149 controlled thereby will be closed when the cam attains positions III, VI, IX, XII, XIII, and XIV, and open in all other positions. The contour of the cam 146 is so conformed that switch 150 controlled thereby will be closed when the cam attains positions IV, V, VI, X, XI, XII, XIII, and XIV and open in all other positions. The contour of cam 147 is so conformed that switch 151 controlled thereby will be open in all positions from I to VI, inclusive, and closed in position VII and all succeeding positions.

In considering operation of the control system of Fig. 2, it may first be assumed that the pressure in the conduit 129 is within the required control zone, and that the shaft 136, with the various control elements carried thereby, is at rest in position I, as shown in Fig. 3. Under this condition the switches 148, 149, 150, and 151 will all be open and the corresponding pumps at rest; limit switch 141 will be opened and limit switch 142 closed. The fact of switch 141 being open makes it impossible for a circuit to be completed through the "high" contact 134 of the controller 130 and the coil 139 of the motor 137, thus preventing operation of the control mechanism should the pressure in conduit 129 rise above the control point while the four pumps are at rest.

It may now be assumed that the pressure in the conduit 129 falls to an extent that contact 132 in the gauge 130 engages the "low" contact 133. A circuit will thus be completed from the positive bus 155 through said contacts, and conductor 157, winding 138 in the motor 137, conductor 158, and the limit switch 142, to the negative bus 156, thus causing the motor 137 to operate and to rotate the shaft 136 in a sense to cause the several control elements to assume position II as seen in Fig. 3. In this position the limit switch 141 will be closed, rendering it possible for the motor to be operated in a sense to return the control element to position I. Switch 142 will remain closed. Switches 149, 150, and 151 will remain open. Switch 148 will be closed, allowing the pump motor 124 to be energized through conductor 161, thus putting pump A into operation, and rendering available a flow of 50 gallons per minute.

Should the flow available from the pump A be sufficient to bring the pressure in the conduit 129 within the required range, the contacts 132 and 133 will be separated and the control mechanism brought to rest. Should the pressure remain below the control point, the motor 137 will continue to operate, advancing the shaft 136 and the control elements carried thereby until position III is attained. In this position, switch 148 will be opened and switch 149 closed, thus bringing pump A to rest and placing pump B in operation, rendering available a flow of 150 gallons per minute.

Should the flow available from pump B be insufficient to bring the pressure up to the desired value, the control apparatus will continue to operate until position IV is attained, at which position switch 149 will be opened bringing pump B to rest; and at the same time cam 146 will close switch 150, energizing motor 126 and placing in service pump C with its available capacity of 200 gallons per minute. Upon a further demand for flow, as indicated by the contacts 132 and 133 in gauge 130 remaining in engagement, the control mechanism will be advanced to position V, allowing pump C to remain on the line, and again closing switch 148 and placing pump A in service, thus rendering available the combined capacity of the two units, or a flow of 250 gallons per minute. Thus, as the demand for increased capacity continues, the cam shaft 136 will continue to advance, causing pumps to be added to, and taken from, the system in combinations as shown in Fig. 3, with increasing capacities, until the final combination represented by position XIII is attained. Under this condition all pumps will be operating, giving a total flow of 800 gallons per minute. A continued low pressure condition will cause the control apparatus to be moved to the position XIV, where the limit switch 142 will be opened, making it impossible for any further advance on the part of the control elements to be effected.

In the event of the pressure in the system rising above the control point, the contact 132 in the instrument 130 will be brought into engagement with the "high" contact 134, and the winding 139 of the motor 137 energized through the conductors 159 and 160 and the limit switch 141, causing the motor to rotate the shaft 136 and the control elements carried thereby in a reverse sense to that hereinbefore described, causing the cam shaft to attain successive positions in a reverse order, and thus effecting successive combinations of pumps in an order of decreasing capacity. It will be obvious that at any time a condition of equilibrium is attained, so that the desired pressure is held in the conduit 129, the contact 132 in the gauge 130 will be cleared from both the contacts 133 and 134 and the controlling mechanism brought to rest in a position corresponding to the desired condition. Thus, with a suitably chosen combination of pump ratings, it is possible to attain a control which will automatically select from said ratings a combination of pumps best suited to meeting the demand for the liquid being handled thereby, and will do this with a minimum deviation of the line pressure from the value at which it is desired that said pressure be maintained.

It is not the intention to limit the scope of the invention to a group of pump ratings or timing schedules as specified in the foregoing description. The invention is applicable to any number of pumps or similar units, and to any desired combination of ratings. While the cams with which the form of the invention shown in Figs. 2 and 3 is provided, are shown as having their contours conformed to a specific arrangement, these may be changed in any manner which may be found expedient. Furthermore, the cams may be designed to have their contours adjustable, either by the use of circumferentially movable sectors similar to the form shown in U. S. Letters Patent 1,959,336, issued to F. J. Bast, May 22, 1934, or by the use of removable and replaceable sectors as shown in U. S. Letters Patent 2,096,182, issued to W. J. Kerr et al., October 19, 1937. Since these expedients are obvious and form no part of the present invention, they are not described in further detail in this disclosure.

It will be noted that in the above described embodiment of Figs. 2 and 3 the time intervals between successive actuations of contacts 148—151 are established by the speed of rotation of the armature of the constant-speed motor 137 which drives the cam shaft 136. Should it be found desirable to obtain increased time delay in the operation of said motor, such may be obtained by the addition of relays similar to the relays 41 and 51 shown in Fig. 1. These relays may be connected in a manner similar to that shown in Fig. 4, which represents a connection system by which relay 41 of Fig. 1 may be incorporated in the circuits shown in Fig. 2. The contacts 44 and 45 of said relay are connected respectively to the positive bus 155 and the winding 138 of the motor 137. The actuating elements of the relay are connected between the "low" contact 133 of the gauge 130 and the negative bus 156. An identical system of connection is adaptable to incorporation of a similar relay into the circuit of the "high" contact of said gauge and of the winding 139 of said motor. Upon closing of either of said contacts, the corresponding relay will be energized, and will act to delay the completion of the motor circuit until after the lapse of the pre-established time interval, after which the cycle control motor 137 will be energized and the control cycle carried out as hereinabove described. Should the circuit remain closed at the contact 133 after the closing of the contacts 44 and 45, the clutch will slip while the timer motor continues to run; and this condition will continue until the contacts of the pressure gauge have been opened.

The terms and expressions which we have employed are used as terms of descriptions and not of limitation, and we have no intention, in the use of such terms and expressions, of excluding any equivalents of the features shown and described or portions thereof, but recognize that various modifications are possible within the scope of the invention claimed.

We claim:

In combination, a plurality of devices operable to maintain a fluid pressure within a predetermined zone of values, gauging means responsive to said pressure and having electrical contacts operated when the pressure value passes outside said zone, a normally deenergized control relay having contacts in circuit with the first mentioned contacts when said control relay is deenergized, timing means in circuit with the contacts of said gauging means and with the said control relay contacts for energization when the contacts of said gauging means are operated and said control relay is deenergized, connections controlled by said timing means for causing said control relay to be energized at the end of a predetermined interval following energization of said timing means with resultant disestablishment of the connection between said control relay contacts and said timing means, means for deenergizing said control relay at the end of a predetermined time following energization thereof for reestablishing said connection between said control relay contacts and said timing means, means comprising a stepping relay and contacts brought into action upon successive operations thereof for bringing different ones of said devices into action to affect the value of said condition, and means comprising contacts controlled by said control relay for operating said stepping relay successively upon successive energizations of said control relay.

ROBERT D. COWHERD.
WILLIAM H. STAHL, Jr.

REFERENCES CITED

The following references are of record in the file of this patent:

UNITED STATES PATENTS

| Number | Name | Date |
| --- | --- | --- |
| 1,009,400 | Fordyce et al. | Nov. 21, 1911 |
| 1,972,812 | Wooley | Sept. 4, 1934 |
| 2,080,232 | Rogers et al. | May 11, 1937 |
| 2,222,595 | Regester | Nov. 26, 1940 |
| 2,223,415 | Groves | Dec. 3, 1940 |
| 2,246,940 | Hood | June 24, 1941 |
| 2,275,502 | Broadhurst | Mar. 10, 1942 |
| 2,312,728 | O'Hagan et al. | Mar. 2, 1943 |